Oct. 9, 1956

C. A. CHAPMAN 2,766,051

STABILIZING DEVICE FOR VEHICLE STEERING ARM COUPLING

Filed Feb. 9, 1954

INVENTOR
Clyde A. Chapman

BY Mason, Fenwick & Lawrence
ATTORNEYS

United States Patent Office 2,766,051
Patented Oct. 9, 1956

2,766,051

STABILIZING DEVICE FOR VEHICLE STEERING ARM COUPLING

Clyde A. Chapman, Brunswick, Ga.

Application February 9, 1954, Serial No. 409,114

5 Claims. (Cl. 280—95)

The present invention relates in general to automobile steering mechanisms, and more particularly to devices for stabilizing automobile steering arm and linkage assemblies, particularly when used with "knee action" spring suspension systems.

Heretofore, a particularly bothersome problem in the design and construction of the steering linkage mechanism and steering arm of automobiles, especially in those having "knee action" spring suspension systems, has been the elimination of rattling and shimmying arising from wear of the components. In the conventional steering mechanism used with "knee action" cars, one end of the steering arm is rotatably supported by a vertically disposed pivot journalled in a bracket supported on the front cross member of the frame. To the other end of the steering arm are pivoted the two tie rods, one of which leads to each steering knuckle. Since the front wheels are supported on "knee action" frames which are pivoted to the front frame cross member and the steering knuckles are supported with the wheels whereby each front wheel will follow the contours of the road without directly affecting movement of the other front wheel, significant vertical stresses are placed on the end of the steering arm connected to the tie rods by the bouncing of the wheels and the consequent up and down movement of the tie rods. These stresses produce corresponding forces on the opposite end of the steering arm coupled to the pivot therefor, causing the steering arm to become worn relative to the pivot and create looseness between these components. Further, the weight supported on the outer end of the steering arm contributes to this looseness. This looseness results in a wobbling of the front wheels of the vehicle and greater tire wear than would occur if the condition were not present. Prior to the development of the present invention, the only way to overcome this wear and looseness in the steering arm coupling was to replace the worn parts whenever wear began to occur.

An object of the present invention, therefore, is the provision of a novel coupling for automobile steering arms which eliminates the above described disadvantages.

Another object of the present invention is the provision of a stabilizing device for steering arm couplings which increases the useful life of the steering mechanism.

Another object of the present invention is the provision of a stabilizing device for steering arms which prevents the development of looseness in the steering arm coupling and thereby lengthens the life of the front tires.

Another object of the present invention is the provision of a stabilizing device for steering arm couplings which can be readily installed on existing steering arm couplings without complete disassembly of parts to support and maintain the steering arm in its proper position and thereby increase its wearing qualities.

Other objects, advantages and capabilities of the present invention will become apparent from the following detailed description taken in conjunction with the accompanying drawing wherein only a preferred embodiment is shown.

Figure 1:
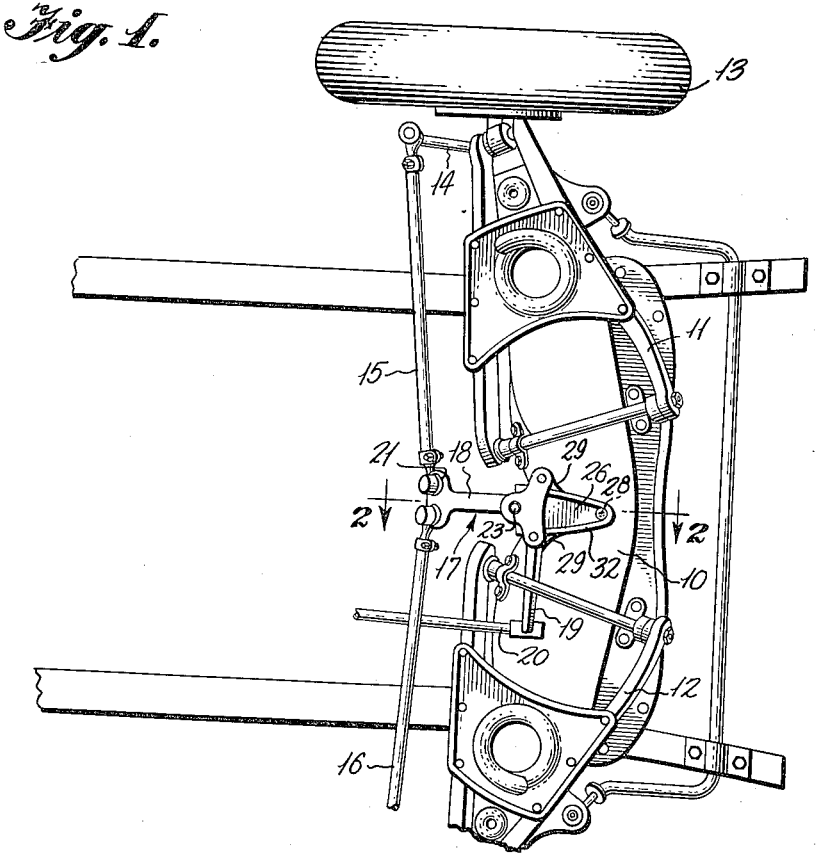
Figure 1 is a bottom plan view of a center steering arm assembly embodying the present invention, illustrated in operative relationship with associated components of the automobile.

Referring to the drawing wherein like reference characters designate corresponding parts throughout the several figures, a preferred embodiment of the invention is illustrated in connection with the front end construction of "Hudson" automobiles having a center steering arm and pivot, the reference character 10 designating the front cross frame member and the reference characters 11 and 12 designating the "knee action" frames which are pivotally supported for vertical movement on the front cross frame member 10. The front wheels, only the wheel 13 being shown, are supported on the outer ends of the "knee action" frames 11 and 12, directional movement of the wheels being controlled in accordance with conventional practice by steering knuckle arms such as the knuckle arm 14 which are pivotally connected with tie rods 15 and 16 extending inwardly to the center steering arm and pivot assembly 17.

Figure 2:
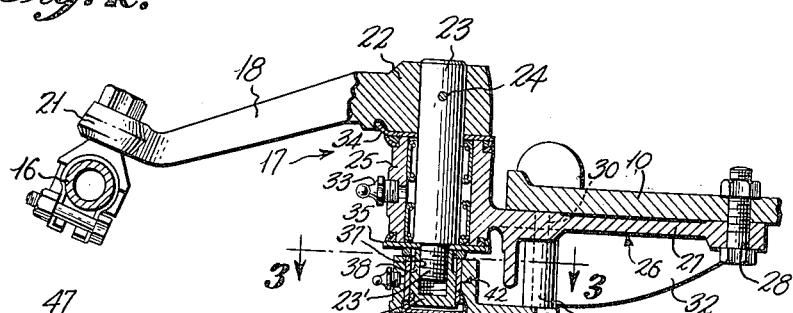
Figure 2 is a vertical longitudinal section taken along the lines 2—2 of Figure 1; and, Figure 3 is a horizontal transverse section, looking down, taken along the lines 3—3 of Figure 2.
Figure 3:
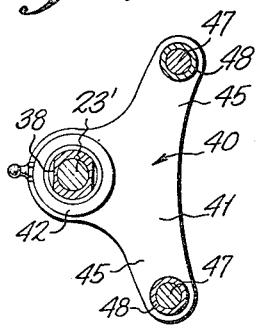

A center steering arm 18 is provided having a projecting arm 19 extending substantially at right angles thereto and connected at its end to a steering connecting rod 20 coupled with and controlled by the steering wheel. The center steering arm 18 is provided with perforated heads 21 at its outermost end to which the inner ends of the tie rods 15 and 16 are pivotally connected, and an enlarged head 22 which is nonrotatably connected to a steering arm pivot 23 formed of a vertically disposed pin by means of a cross pin 24. The pivot pin 23 extends through the central bore of an enlarged bearing head 25 integrally formed on a steering arm bracket 26. The bracket 26, as will clearly be seen from inspection of Figures 1 and 2, is preferably formed of cast iron and comprises a horizontal base plate 27 of generally triangular formation in plan view having an aperture 28 adjacent the forwardly extending apex of the plate through which a mounting bolt extends to secure the bracket 26 to the front cross frame member 10.

Additionally, wing portions 29 extend outwardly along either side of the bracket in the plane of the plate 27 having apertures 30 therein normally adapted to receive stud bolts to be threaded into the front cross frame member 10 and support the forward end of the bracket. The sides of the base plate 27 are bounded by depending reinforcing flanges 32 having a downwardly curving arcuate edge when viewed in elevation extending from a point adjacent the forward apex of the plate 27 to a maximum depth at a point adjacent the wing portions 29, and continuing at substantially the same depth to a point laterally aligned with the vertical pivot pin 23. The bearing head 25 is provided with the usual grease fitting 33 and spacer washers 34 and 35 are provided at the upper and lower faces of the bearing head 25.

In accordance with the present invention, a cylindrical pivot pin extension fitting 36 is provided to be threaded on to the lower threaded end 23′ of the pivot pin 23 which normally receives a conventional locking nut. The extension fitting 36 is of the same diameter throughout as the pivot pin 23 and has a threaded socket 37 to cooperate with the threaded end 23′ of the pivot pin 23. To facilitate threading of the fitting 36 on the threaded end 23′ of the pivot, opposite flat cut-outs 38 are formed on the upper periphery of the fitting.

Cooperating with the pivot extension fitting 36 to provide a parallelogram bracing structure for the pivot is a pivot extension bearing support 40 comprising a distorted triangular plate 41 having an integral upwardly opening annular bearing sleeve 42 having a vertical bore 43 extending therethrough and lined with a brass liner 44 to accommodate and support the extension fitting 36 against movement out of its normal vertical position. The plate 41 is adapted to bear against the lower edges of the reinforcing flanges 32 and is provided with laterally extending wing portions 45 complementary with the wings 29 of the bracket 26. The wing portions 45 of the bearing support 40 have apertures 46 therein registering with the apertures 30 in the bracket wing portion 29 to receive elongated stud bolts 47 adapted to project through the aligned apertures 46 and 30 and be threaded into threaded sockets provided therefor in the front cross frame member 10 to hold the bearing support 40 and bracket 26 as a fixed unit on the cross frame. Suitable spacer sleeves 48 of a length corresponding to the maximum depth of the reinforcing flanges 32 surround the shanks of the bolts 47 to assist in holding the extension bearing support 40 in proper position relative to the bracket 26. The bracing parallelogram previously referred to is constituted by the portion of the plate 27 extending between the pivot pin 23 and stud bolts 47 clamping the wings 45 of the bearing support 40 against the reinforcing flanges 32, the stud bolts 47, the plate portion 41 and the annular bearing sleeve 42 of the extension bearing support 40, the extension fitting 36, and the pivot pin 23, which bracing arrangement is effective to resist canting of the pivot pin 23 away from its normal vertical axis.

Preferably, the bore 43 is provided with a portion of enlarged diameter adjacent its lower end to removably receive a plug 49 for closing the lower end of the bore 43.

The extension bearing support 40 and pivot extension fitting 36 are assembled with the steering arm mechanism and supporting bracket in the following manner. The pivot pin locking nut, which is conventionally provided on the threaded end 23' of the pivot pin 23, is removed from the threaded end 23' when the first evidences of wear arise. The pivot extension fitting 36 is then threaded onto the threaded end 23' of the pivot 23 by fitting the jaws of a wrench or other suitable tool in the flat cut-outs 38 and threading the fitting 36 in place. The usual mounting bolts normally extending through the apertures 30 in the wings 29 of the bracket 26 are removed from the threaded sockets provided therefor in the front cross frame member 10 and the bore 43 of the extension bearing support 40 is slipped over the pivot extension fitting 36 until the plate portion 41 of the extension support 40 bears against the lower edges of the reinforcing ribs 32. The apertures 46 in the wings 45 of the extension support 40 are then disposed in registry with the apertures 30 in the wing portions 29 of the bracket 26, the spacer sleeves 48 are moved into registry with these apertures between the support 40 and bracket 26, and the elongated stud bolts 47 are inserted through the aligned apertures and spacer sleeves and threaded into the sockets of the front cross frame member 10 aligned therewith. The removable plug 49 is then fitted into the enlarged diameter lower portion of the bore 43.

It will be seen that when the pivot extension fitting 36 and extension bearing support 40 are assembled in position on the bracket 26, a rigid rectangular bracing structure is formed in cooperation with the bracket 26 to rigidly hold the pivot pin 23 in its proper position of vertical alignment within the bearing head 25 of the bracket 26, and will resist the stress imposed on the center steering arm 18 and pivot pin 31 by the tie rods 15 and 16 which tend to shift the pivot pin 23 out of its proper position of alignment and produce wear which results in undesirable vibration and shimmying. Further, because of the particular construction of the pivot extension fitting 36 bearing against the lower washer 35 and its association with the pivot pin 23, the fitting 36 may be adjusted to the desired position on the threaded end 23' of the pivot pin to equalize pressure and wearing stresses on the washers 34 and 35 at the upper and lower faces of the bearing head 25, thus providing protection against undesirable wear at these points.

While but one particular embodiment of the invention has been particularly shown and described, it is apparent that various modifications may be made in the invention without departing from the spirit and scope thereof, and it is desired, therefore, that only such limitations shall be placed thereon as are imposed by the prior art and are set forth in the appended claims.

I claim:

1. A stabilizing assembly for a vehicle steering mechanism which includes a bearing bracket fixed to a front cross frame member of the vehicle and having a portion projecting therefrom terminating in a single bearing head, a vertical pivot pin journalled in and projecting above and below said bearing head, and a steering arm fixed on the upper end of said pivot pin; comprising a cylindrical extension means of substantially the diameter of said pivot pin removably secured in downwardly projecting relation on the lower end of said pivot pin, an interconnecting support means between said bearing bracket and said extension means including an upwardly projecting cup-shaped bearing having a bore complementary to said extension means to rotatably accommodate said extension means, means projecting from said bearing along the projecting portion of said bearing bracket and parallel thereto, and securing means extending at right angles to said support projecting means and spaced from said bearing for rigidly interconnecting said support means and said bracket and forming therewith a bracing structure for resisting lateral canting of said pivot pin and extension means out of vertical position.

2. A stabilizing assembly for a vehicle steering mechanism which includes a bearing bracket fixed to a front cross-frame member of the vehicle and having a portion projecting therefrom terminating in a single bearing head, a vertical pivot pin journalled in and projecting above and below said bearing head, and a steering arm fixed on the upper end of said pivot pin; comprising a cylindrical extension fitting having means for securing the same in downwardly projecting relation on said pivot pin, an extension bearing support having an upwardly projecting cup-shaped bearing to be fitted onto and rotatably accommodate said extension fitting, and securing means located along said projecting portion of said bracket in spaced relation to said bearing for rigidly fixing said support to said bracket and forming with said bracket and support a bracing structure resisting lateral canting of said pivot pin out of vertical position.

3. A stabilizing assembly for a vehicle steering mechanism which includes a bearing bracket fixed to a front cross-frame member of the vehicle and having a portion projecting therefrom terminating in a single bearing head, a vertical pivot pin journalled in and projecting above and below said bearing head, said pivot pin terminating in a threaded portion below said bearing head, and a steering arm fixed at its inner end on the upper end of said pivot pin; comprising a cylindrical extension fitting having a socket for threading said fitting on the threaded portion of said pivot pin, an extension bearing support having an upwardly projecting bearing sleeve to be fitted onto and rotatably accommodate said extension fitting, and securing means located along said projecting portion of said bracket in spaced relation to said bearing sleeve for rigidly fixing said support to said bracket and forming with said bracket and support a parallelogram bracing structure resisting lateral canting of said pivot pin out of vertical position.

4. In a vehicle steering mechanism including a bearing bracket fixed to a front cross frame member of the vehicle having a body portion projecting therefrom and terminating in a bearing head and depending reinforcing flanges including rectilinear edge portions of equal depth extending parallel to said projecting body portion, a vertical pin journalled in and projecting above and below said bearing head, said pin terminating in a threaded end below said bearing head, and a center-point steering arm fixed at its inner end on the upper end of said pin, a stabilizing assembly comprising a cylindrical extension fitting of the diameter of said pin threaded on the threaded end of said pin, an extension bearing support having a plate portion substantially coextensive with the projecting body portion of said bearing bracket to bear against the rectilinear edge portion of said depending flanges and an upwardly opening cup-shaped bearing integral with said plate portion to be fitted onto and rotatably accommodate said extension fitting, securing means extending between the coextensive portions of said bearing bracket and said plate portion of said bearing support at points along said projecting body portion of said bracket spaced from said bearing for rigidly mounting said support on said bracket, said extension fitting, said bearing support and said bracket forming with said pin a stress-resistant parallelogram bracing structure for restraining the end of said pin threaded to said extension fitting against lateral canting movement out of vertical position.

5. In a vehicle steering mechanism including a bearing bracket fixed to a front cross-frame member of the vehicle having a body portion projecting therefrom and terminating in a bearing head and depending reinforcing flanges including rectilinear edge portions of equal depth extending parallel to said projecting body portion, a vertical pivot pin journalled in and projecting above and below said bearing head, said pivot pin terminating in a threaded end below said bearing head, and a steering idler arm fixed at its inner end on the upper end of said pivot pin, a stabilizing assembly comprising a cylindrical extension fitting of the diameter of said pivot pin threaded on the threaded end of said pivot pin, an extension bearing support having a plate portion substantially coextensive with the projecting body portion of said bearing bracket to bear against the rectilinear edge portion of said depending flanges and an upstanding annular bearing sleeve integral with said plate portion having a bore complementary to said extension fitting to rotatably accommodate said extension fitting, securing means extending between the coextensive portions of said bearing bracket and said plate portion of said bearing support at points along said projecting body portion of said bracket spaced from said bearing sleeve for rigidly mounting said support on said bracket, said extension fitting, said bearing support and said bracket and said securing means therebetween forming with said pivot pin a stress-resistant bracing parallelogram for restraining the end of said pivot pin threaded to said extension fitting against lateral canting movement out of vertical position.

References Cited in the file of this patent

UNITED STATES PATENTS

| | | |
|---|---|---|
| 2,588,544 | Langer | Mar. 1, 1952 |
| 2,620,202 | Coleman | Dec. 2, 1952 |
| 2,632,656 | Balcom | Mar. 24, 1953 |